United States Patent
Huang et al.

(10) Patent No.: US 11,278,176 B2
(45) Date of Patent: Mar. 22, 2022

(54) SCHEDULING SYSTEM FOR AUTONOMOUS ROBOTS

(71) Applicant: iRobot Corporation, Bedford, MA (US)

(72) Inventors: Qunxi Huang, Somerville, MA (US);
Chris Lee, Bedford, MA (US);
Domingos Neves, Bedford, MA (US);
Ryan Lesko, Bedford, MA (US);
Manuel Medina, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 323 days.

(21) Appl. No.: 16/123,994

(22) Filed: Sep. 6, 2018

(65) Prior Publication Data

US 2020/0077863 A1    Mar. 12, 2020

(51) Int. Cl.
*A47L 11/40*        (2006.01)
*G05D 1/00*         (2006.01)
*G06F 3/04847*      (2022.01)

(52) U.S. Cl.
CPC ........ *A47L 11/4061* (2013.01); *G05D 1/0027* (2013.01); *G05D 1/0088* (2013.01);
(Continued)

(58) Field of Classification Search
CPC ............. A47L 11/4061; A47L 2201/04; G05D 1/0027; G05D 1/0088; G05D 2201/0203; G06F 3/04847
See application file for complete search history.

(56) References Cited

U.S. PATENT DOCUMENTS

| 8,972,052 B2 | 3/2015 | Chiappetta |
| 9,008,835 B2 | 4/2015 | Dubrovsky |

(Continued)

FOREIGN PATENT DOCUMENTS

| CN | 110879545 | 3/2020 |
| EP | 2725443 | 4/2014 |
| KR | 20170087403 | 7/2017 |

OTHER PUBLICATIONS

"European Application Serial No. 19194970.0, Extended European Search Report dated Feb. 28, 2020", 4 pgs.

(Continued)

*Primary Examiner* — Jeff A Burke
*Assistant Examiner* — Mohamad O El Sayah
(74) *Attorney, Agent, or Firm* — Schwegman Lundberg & Woessner, P.A.

(57) ABSTRACT

A method of operating an autonomous cleaning robot includes receiving, at a handheld computing device, a first input representing a first set of cleaning schedule parameters for a first cleaning schedule for the autonomous cleaning robot, the first cleaning schedule corresponding to a first area. The method includes presenting, on a display of the handheld computing device, the first cleaning schedule. The method includes receiving, at the handheld computing device, a second input representing a second set of cleaning schedule parameters for a second cleaning schedule for the autonomous cleaning robot, the second cleaning schedule corresponding to a second area different from the first area. The method includes presenting, on the display, the first and second cleaning schedules, and initiating a transmission to the autonomous cleaning robot, based on the first or second cleaning schedules, the transmission including data for causing the robot to initiate a cleaning mission.

20 Claims, 13 Drawing Sheets

(52) U.S. Cl.
CPC ...... *G06F 3/04847* (2013.01); *A47L 2201/04* (2013.01); *G05D 2201/0203* (2013.01)

(56) References Cited

U.S. PATENT DOCUMENTS

| | | | |
|---|---|---|---|
| 2014/0207280 A1 | 7/2014 | Duffley et al. | |
| 2014/0207282 A1* | 7/2014 | Angle | H04L 12/2809 700/257 |
| 2016/0135655 A1* | 5/2016 | Ahn | G05D 1/0044 134/56 R |
| 2017/0113354 A1* | 4/2017 | Dubrovsky | G05D 1/0022 |
| 2017/0265703 A1* | 9/2017 | Park | A47L 9/28 |
| 2018/0311815 A1* | 11/2018 | Shaw | G06F 9/45558 |
| 2020/0029774 A1* | 1/2020 | Mellinger, III | A47L 11/4061 |
| 2020/0069140 A1* | 3/2020 | Orzechowski | G05D 1/0016 |

OTHER PUBLICATIONS

"European Application Serial No. 19194970.0, Communication Pursuant to Article 94(3) EPC dated Mar. 12, 2020", 4 pgs.

"Neato All-Floor Robotic Vacuum User's Guide," Neato Robotics, Inc., 2011, 174 pages.

"Neato Botvac Connected" Product Manual, Neato Robotics, Inc., [undated], 52 pages.

"European Application Serial No. 19194970.0, Response filed Sep. 22, 2020 to Communication Pursuant to Article 94(3) EPC dated Mar. 12, 2020", 10 pgs.

"European Application Serial No. 19194970.0, Communication Pursuant to Article 94(3) EPC dated Feb. 9, 2021", 4 pgs.

"European Application Serial No. 19194970.0, Response filed Aug. 17, 2021 to Communication Pursuant to Article 94(3) EPC dated Feb. 9, 2021", 14 pgs.

\* cited by examiner

SCHEDULING SYSTEM FOR AUTONOMOUS ROBOTS

TECHNICAL FIELD

This specification relates generally to control systems for autonomous cleaning robots. In one exemplary system, schedules are used for controlling an autonomous cleaning robot.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

An application executed on a mobile device can be used to control scheduling cleaning missions for an autonomous cleaning robot. The user can, through the mobile application, change cleaning parameters, scheduling, etc., of the autonomous cleaning robot. During a cleaning mission, the autonomous cleaning robot performs cleaning tasks (e.g., vacuuming, mopping, etc.) as the autonomous cleaning robot traverses the environment. Scheduling interfaces of the mobile application allow the user to add, delete, change, etc., times, cleaning parameters, areas (e.g., rooms, floors, etc.), and other types of information used in the cleaning mission. In some examples, through the mobile application, the user can perform room-by-room cleaning, create different schedules for different days, create different schedules for different rooms or collections of rooms, and create recurring schedules.

Described herein are examples of methods and devices for scheduling and using mobile robots configured to traverse floor surfaces and perform various operations including, but not limited to, cleaning. Advantages of the foregoing may include, but are not limited to, those described below and herein elsewhere.

Generating custom schedules allows a user to perform cleaning of particular areas (e.g., rooms, floors) of the user's home when the user desires. For example, the user may direct the autonomous cleaning robot to clean a downstairs area every Monday, Wednesday, and Friday, at 9:00 AM, perhaps after the user has left home so the cleaning will not be disruptive to the user. Scheduling cleaning missions allows a user to set recurring cleaning missions so the user does not have to remember to manually initiate cleaning missions. Scheduling cleaning missions may also be done through the mobile application when the user is away from home.

In one aspect, a method of operating an autonomous cleaning robot is provided. The method includes receiving, at a handheld computing device, a first input representing a first set of cleaning schedule parameters for a first cleaning schedule for the autonomous cleaning robot, the first cleaning schedule corresponding to a first area. The method also includes presenting, on a display of the handheld computing device, the first cleaning schedule. The method also includes receiving, at the handheld computing device, a second input representing a second set of cleaning schedule parameters for a second cleaning schedule for the autonomous cleaning robot, the second cleaning schedule corresponding to a second area different from the first area. The method also includes presenting, on the display of the handheld computing device, the second cleaning schedule and the first cleaning schedule. The method also includes initiating a transmission to the autonomous cleaning robot, based on the first cleaning schedule or the second cleaning schedule, the transmission including data for causing the autonomous cleaning robot to initiate a cleaning mission.

In some implementations, the first area includes a first set of rooms and second area includes a second set of rooms, at least one room in the second set of rooms being different from the first set of rooms.

In some implementations, the first cleaning schedule and the second cleaning schedule are scheduled for the same day.

In some implementations, the first set of cleaning schedule parameters includes a setting for a number of cleaning passes.

In some implementations, the first cleaning schedule presented on the display is selectable to activate or deactivate the first cleaning schedule.

In some implementations, at least one of the first cleaning schedule and the second cleaning schedule is selectable to be activated in a recurring manner.

In some implementations, at least one of the first cleaning schedule and the second cleaning schedule is selectable to be activated for a single instance.

In some implementations, the first set of cleaning schedule parameters includes at least one parameter representing a cleaning area for the first cleaning schedule, and the second set of cleaning schedule parameters includes at least one parameter representing a cleaning area for the second cleaning schedule.

In some implementations, at least one of the first set of cleaning schedule parameters and the second set of cleaning schedule parameters includes selectable rooms for cleaning by the autonomous cleaning robot.

In some implementations, at least one of the first set of cleaning schedule parameters and the second set of cleaning schedule parameters includes a selection to clean all areas during the cleaning mission.

In some implementations, at least one of the first set of cleaning schedule parameters and the second set of cleaning schedule parameters includes selectable floors for cleaning by the autonomous cleaning robot.

In another aspect, handheld computing device is provided. The handheld computing device includes one or more input devices configured to receive a first input representing a first set of cleaning schedule parameters for a first cleaning schedule for an autonomous cleaning robot, the first cleaning schedule corresponding to a first area, and receive a second input representing a second set of cleaning schedule parameters for a second cleaning schedule for the autonomous cleaning robot, the second cleaning schedule corresponding to a second area different from the first area. The handheld cleaning device also includes a display. The handheld cleaning device includes a processor configured to present, on the display, the first cleaning schedule. The processor is configured to present, on the display, the second cleaning schedule. The processor is configured to initiate a transmission to the autonomous cleaning robot, based on the first cleaning schedule or the second cleaning schedule, the transmission including data for causing the autonomous cleaning robot to initiate a cleaning mission.

In some implementations, the first area includes a first set of rooms and second area includes a second set of rooms, at least one room in the second set of rooms being different from the first set of rooms.

In some implementations, the first cleaning schedule and the second cleaning schedule are scheduled for the same day.

In some implementations, the first set of cleaning schedule parameters includes a setting for a number of cleaning passes.

In some implementations, the first cleaning schedule presented on the display is selectable to activate or deactivate the first cleaning schedule.

In some implementations, at least one of the first cleaning schedule and the second cleaning schedule is selectable to be activated in a recurring manner.

In some implementations, at least one of the first cleaning schedule and the second cleaning schedule is selectable to be activated for a single instance.

In some implementations, the first set of cleaning schedule parameters includes at least one parameter representing a cleaning area for the first cleaning schedule, and the second set of cleaning schedule parameters includes at least one parameter representing a cleaning area for the second cleaning schedule.

In some implementations, at least one of the first set of cleaning schedule parameters and the second set of cleaning schedule parameters includes selectable rooms for cleaning by the autonomous cleaning robot.

In some implementations, at least one of the first set of cleaning schedule parameters and the second set of cleaning schedule parameters includes a selection to clean all areas during the cleaning mission.

In some implementations, at least one of the first set of cleaning schedule parameters and the second set of cleaning schedule parameters includes selectable floors for cleaning by the autonomous cleaning robot.

The details of one or more implementations are set forth in the accompanying drawings and the description below. Other features and advantages will be apparent from the description and drawings, and from the claims.

DETAILED DESCRIPTION

An application executed by a mobile device can be used to control scheduling cleaning missions for an autonomous cleaning robot. The user can, through the mobile application, change cleaning parameters, scheduling, etc., of the autonomous cleaning robot. During a cleaning mission, the autonomous cleaning robot performs cleaning tasks (e.g., vacuuming, mopping, etc.) as the autonomous cleaning robot traverses the environment. Scheduling interfaces of the mobile application allow the user to add, delete, change, etc., times, cleaning parameters, areas (e.g., rooms, floors, etc.), and other types of information used in the cleaning mission. In some examples, through the mobile application, the user can perform room-by-room cleaning, create different schedules for different days, and create recurring schedules.

Figure 1:
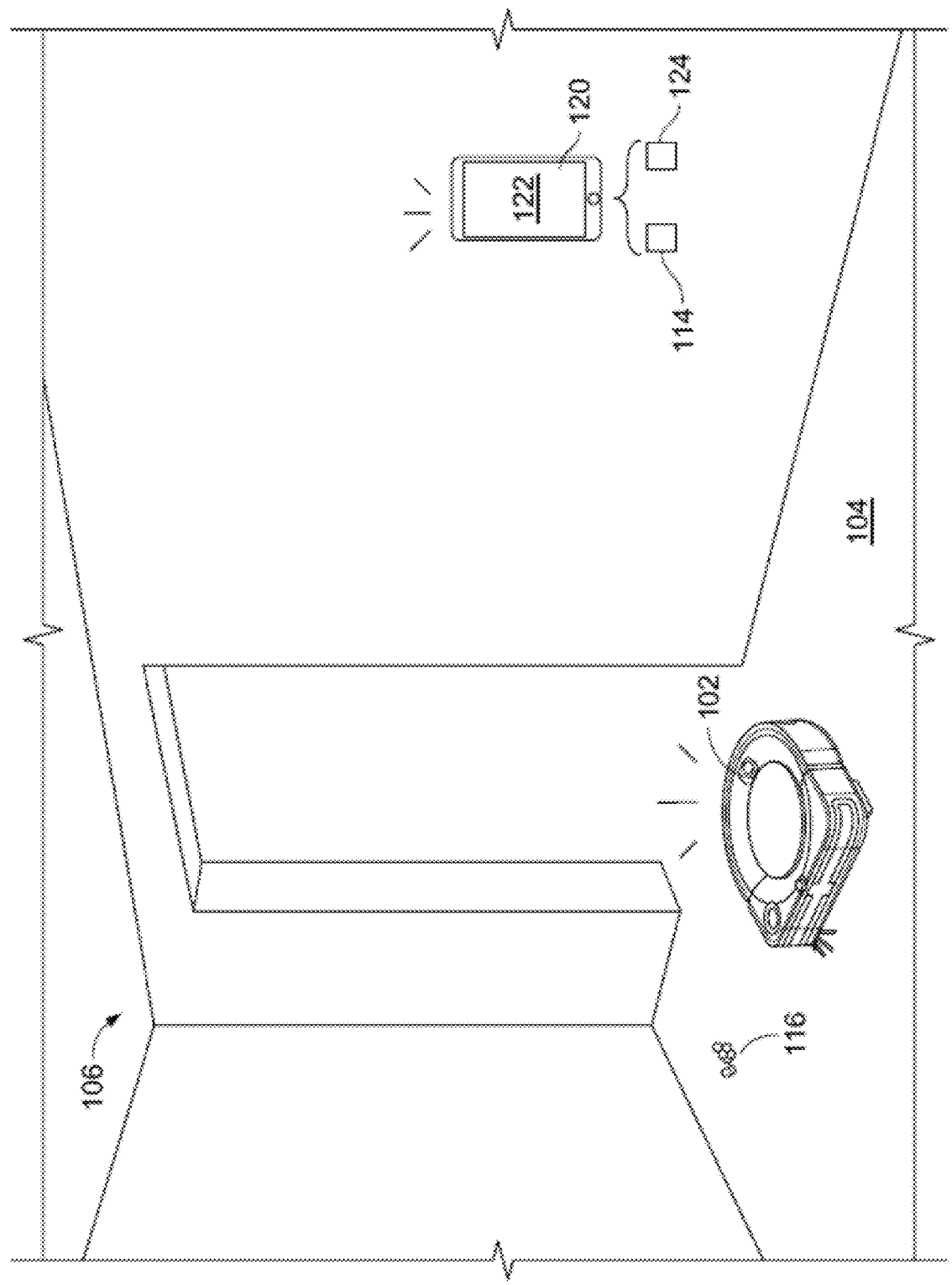
FIG. 1 illustrates an environment including an autonomous cleaning robot and a handheld computing device.

Referring to FIG. 1, an autonomous cleaning robot 102 is located on a floor surface 104 within a room 106. The autonomous cleaning robot 102 is configured to communicate with a mobile device 120. A mobile device 120 as described herein may include a smart phone, a cellular phone, personal digital assistant, laptop computer, tablet, smart watch, other portable (e.g., handheld) computing device, etc., capable of transmitting and receiving signals related to a robot cleaning mission. The mobile device 120 is configured to present, on a display 122, information relating to a robot training run, cleaning mission, etc. and receive an input from a user. The mobile device 120 includes a processor 114 configured to initiate data transmission and reception (via the internet, etc.) with the autonomous cleaning robot 102 and run a mobile application 124 configured to present scheduling interfaces on the display 122 of the mobile device 120. The scheduling interfaces presented on the display 122 of the mobile device 120 allow the user to create custom schedules.

Figure 2:
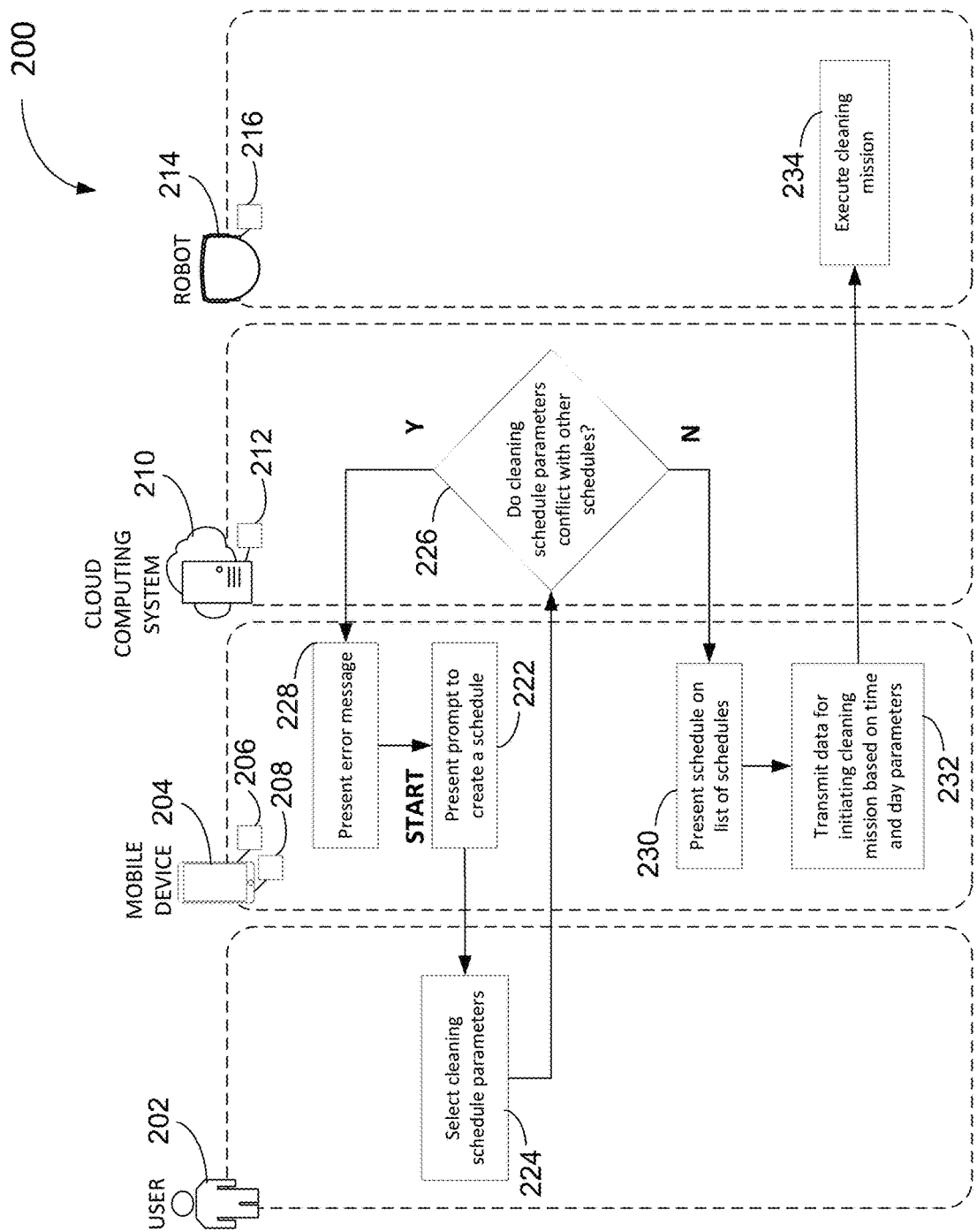
FIG. 2 is a flow chart showing communication between a user, a mobile device, a cloud computing system, and an autonomous cleaning robot.

Referring to FIG. 2, a schematic 200 depicts communication among a user 202, a mobile device 204, a cloud computing system 210, and an autonomous cleaning robot 214. A mobile application 208, executed by a processor 206 on the mobile device 204, presents (222) an interface including a prompt to create a cleaning schedule for the autonomous cleaning robot 214. The user 202, through at least one input (e.g., a button, a touch screen display, etc.) of the mobile device 204, selects (224) cleaning schedule parameters. Cleaning schedule parameters include scheduling parameters (time, day, frequency, etc.) and cleaning parameters (spot cleaning, edge cleaning, etc.), to define the schedule. The cloud computing system 210, checks (226), by a processor 212, whether parameters of the selected cleaning schedule conflict with previously stored cleaning schedules. In some implementations, cleaning schedules may not overlap, may not be within a certain amount of time (e.g., 3 hours) after another cleaning schedule (e.g., to allow time for completion of the cleaning schedule and charging time), etc. If the selected cleaning schedule conflicts with another cleaning schedule, an error message is presented (228) on the mobile device 204 and the user 202 is prompted (222) to create a new cleaning schedule. If the selected cleaning schedule does not conflict with another cleaning schedule, the selected cleaning schedule is presented (230) on a list of cleaning schedules.

At a time corresponding to a scheduled time of the cleaning schedule, the mobile device 204 transmits (232) data to the autonomous cleaning robot 214 to cause the autonomous cleaning robot 214 to initiate a cleaning mission according to the cleaning schedule. A processor 216 of the autonomous cleaning robot 214 causes the autonomous cleaning robot to execute (234) the cleaning mission according to the schedule. The cleaning schedule may instruct the autonomous cleaning robot 214 to perform specific cleaning tasks, clean specific areas (e.g., rooms, floors), etc., as discussed below with respect to FIGS. 3-11.

Overall, FIGS. 3-11 illustrate various types of information that can be presented, edited, etc. on the mobile device 204. By presenting this information and allowing the user 402 to edit the information, custom cleaning schedules can be generated. The autonomous cleaning robot 214 performs cleaning missions defined by (e.g., what area, what time, how often, etc.) the custom cleaning schedules.

Figure 3:
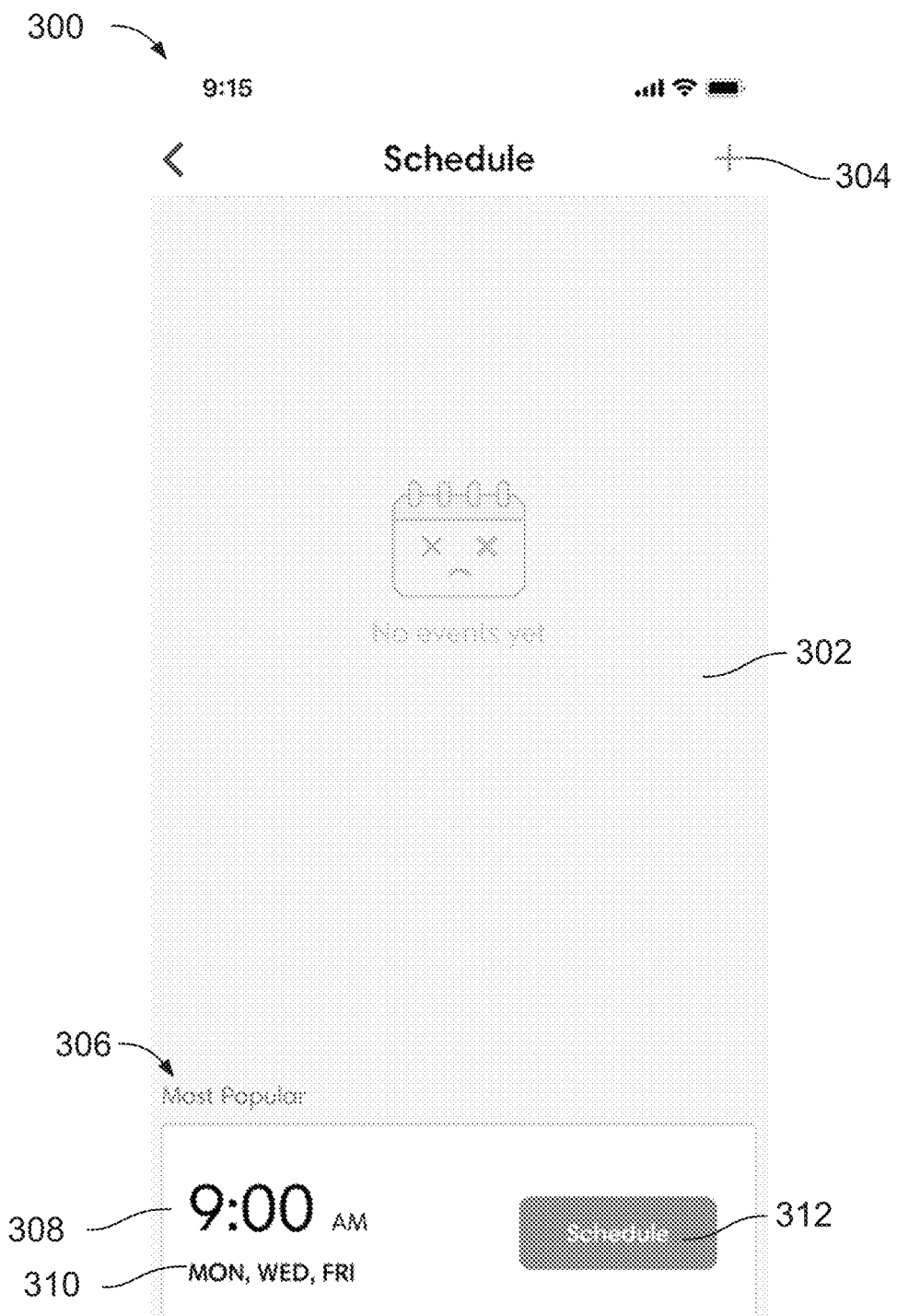
FIG. 3 is an interface showing an empty scheduling list.

Referring to FIG. 3, an interface 300 is presented on a display of the mobile device 204. The interface 300 includes a display area 302 configured to present a list of stored cleaning schedules. In this instance, the display area 302 is empty. Selecting an add button 304 allows the user 202 to open a scheduling interface (as shown in FIGS. 4-7) to create a new cleaning schedule. The interface 300 also presents a suggested schedule 306, including a time 308 and a list of days 310 that may be added to the scheduling list 302 and would be presented in the area 302. Selecting a schedule button 312 adds the suggested schedule 306 to the scheduling list 302 and schedules the autonomous cleaning robot 214 for a cleaning mission. In this example, a recurring cleaning mission that takes place at 9:00 AM on Mondays, Wednesdays, and Fridays is created when button 312 is selected.

Figure 4A:
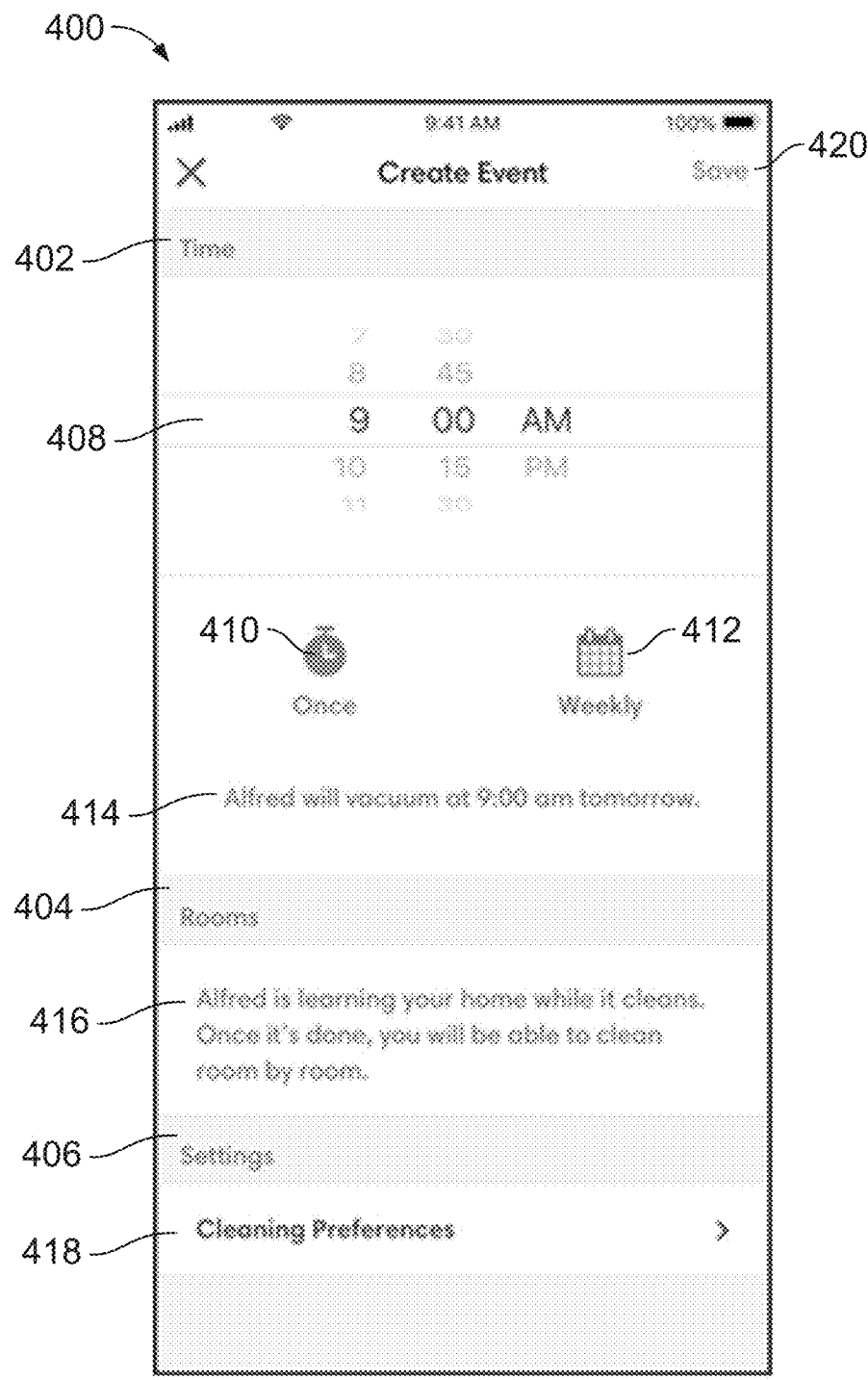
FIG. 4A is an interface showing scheduling options for scheduling a one-time cleaning mission for the autonomous cleaning robot shown in FIG. 1.
Figure 4B:
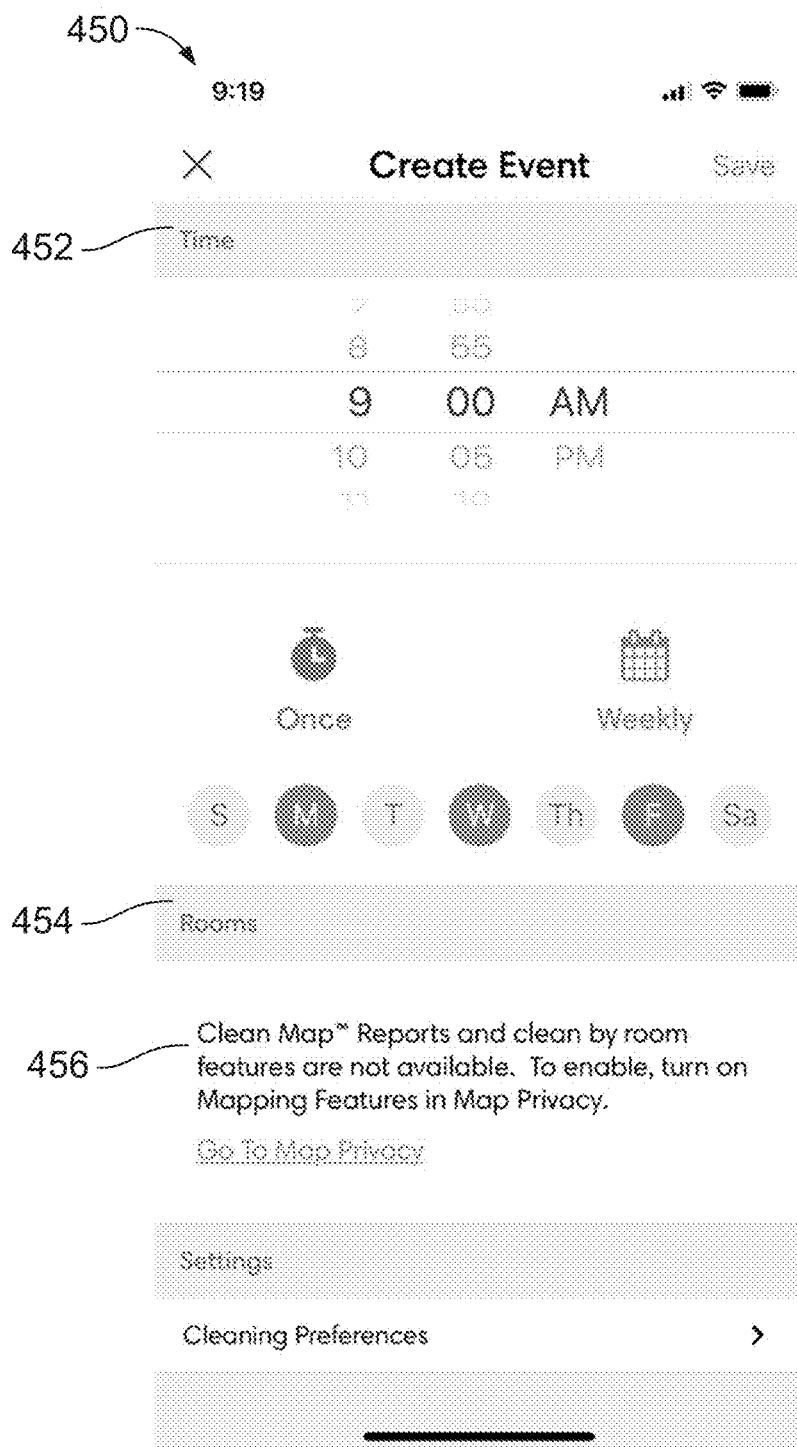
FIG. 4B is an interface showing scheduling options when mapping privacy settings are enabled.

Referring to FIG. 4A, an interface 400 is presented on the display of the mobile device 204. The interface 400 is configured to allow the user 202 to set a cleaning schedule for the autonomous cleaning robot 214 by selecting a time and frequency (section 402), rooms (section 404), and settings (section 406) for the cleaning schedule. The time section 402 includes a time selector 408, a button 410 (to set a cleaning mission for a single day), referred to as a "once button", and a button 412 (to set recurring cleaning missions) referred to as a "weekly button". The time selector 408 is configured to be adjusted to a desired time for the cleaning mission. The once button 410 may be selected to configure the cleaning mission as a one-time cleaning mission. In such instances, as shown here, a one-time cleaning mission will schedule the cleaning mission at the time indicated on the time selector 408. A text indicator 414 informs the user 202 that the autonomous cleaning robot 214 will perform the cleaning mission at the set time (here, at 9:00 AM on the next day, as 9:00 AM on the current day has already passed). When the autonomous cleaning robot 214 is still learning the user's space (e.g., the user's home), room-by-room cleaning is not available in the rooms section 404. Text 416 informs the user that room-by-room cleaning is unavailable and that the autonomous cleaning robot (here, named "Alfred") learns as it cleans. Referring to FIG. 4B, if the user 202 has enabled privacy settings in the mobile application 208 to prohibit the storing of maps, an interface 450 is presented that indicates, via text 456 in a room section 454, that room-by-room cleaning is unavailable.

Referring back to FIG. 4A, in the settings section 406, a cleaning preferences option 418 is selectable. Selecting the cleaning preferences option 418 opens an interface such as interface 800 shown in FIG. 8. Cleaning preferences may be selected for the schedule created in interface 400. Cleaning preferences may include, for example, a number of cleaning passes, edge cleaning, spot cleaning, a vacuum power, etc. In some implementations, cleaning preferences may be selectable on interface 400 without the need to select the cleaning preferences option 418 and open a separate interface 800. When the user 202 is finished selecting cleaning schedule parameters in the time section 402, rooms section 404, and settings section 406, the user 202 selects the save button 420 to add the schedule to the list 302 shown in FIG. 3.

Figure 5:
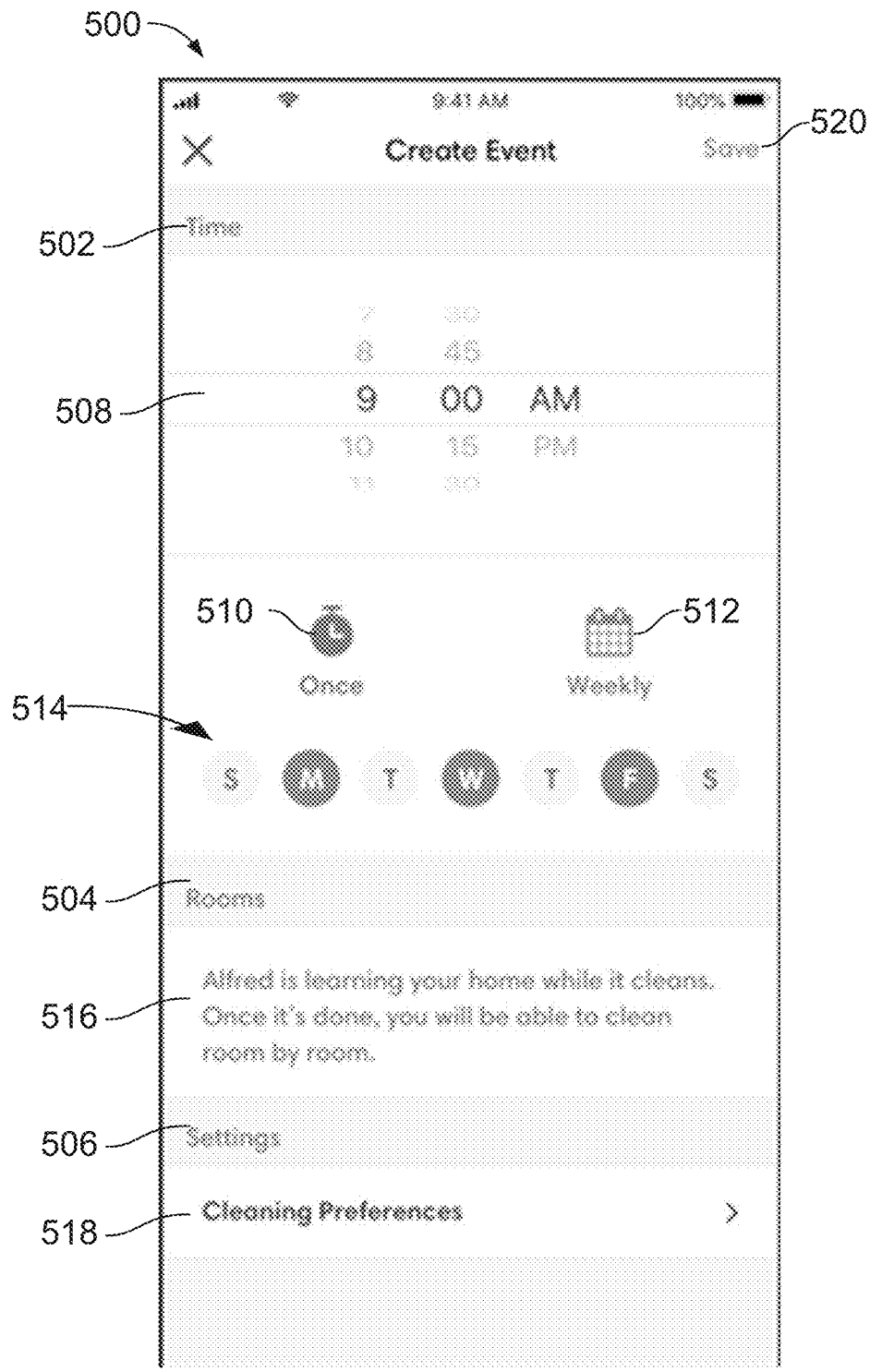
FIG. 5 and FIG. 6 are interfaces showing scheduling options for scheduling a recurring cleaning mission for the autonomous cleaning robot shown in FIG. 1.

Referring to FIG. 5, an interface 500 for setting a cleaning schedule for the autonomous cleaning robot 214 is presented. The interface 500, which is similar to interface 400, includes a time section 502, a rooms section 504, and a settings section 506. In the time section 502, a once button 510 and a weekly button 512 are presented along with a time selector 508. On interface 500, because the weekly button 512 is selected, an array of day buttons 514 (the buttons each corresponding to a day of the week) is presented. The user 202 may select individual day buttons in the array 514 to have the schedule repeat on each of the corresponding days of the week. For example, the schedule set in interface 500 will cause the mobile device 204 to transmit data to the autonomous cleaning robot 214 to initiate a cleaning mission at 9:00 AM on every Monday, Wednesday, and Friday. In some implementations, data may be sent in a single transmission, a series of transmissions, etc., to provide data to the autonomous cleaning robot 214. As mentioned previously with respect to FIG. 4A, room-by-room cleaning is unavailable until the autonomous cleaning robot 214 has learned the user's space. The user 202 may select cleaning parameters via a cleaning preferences option 518 in the settings section 506.

Figure 6:
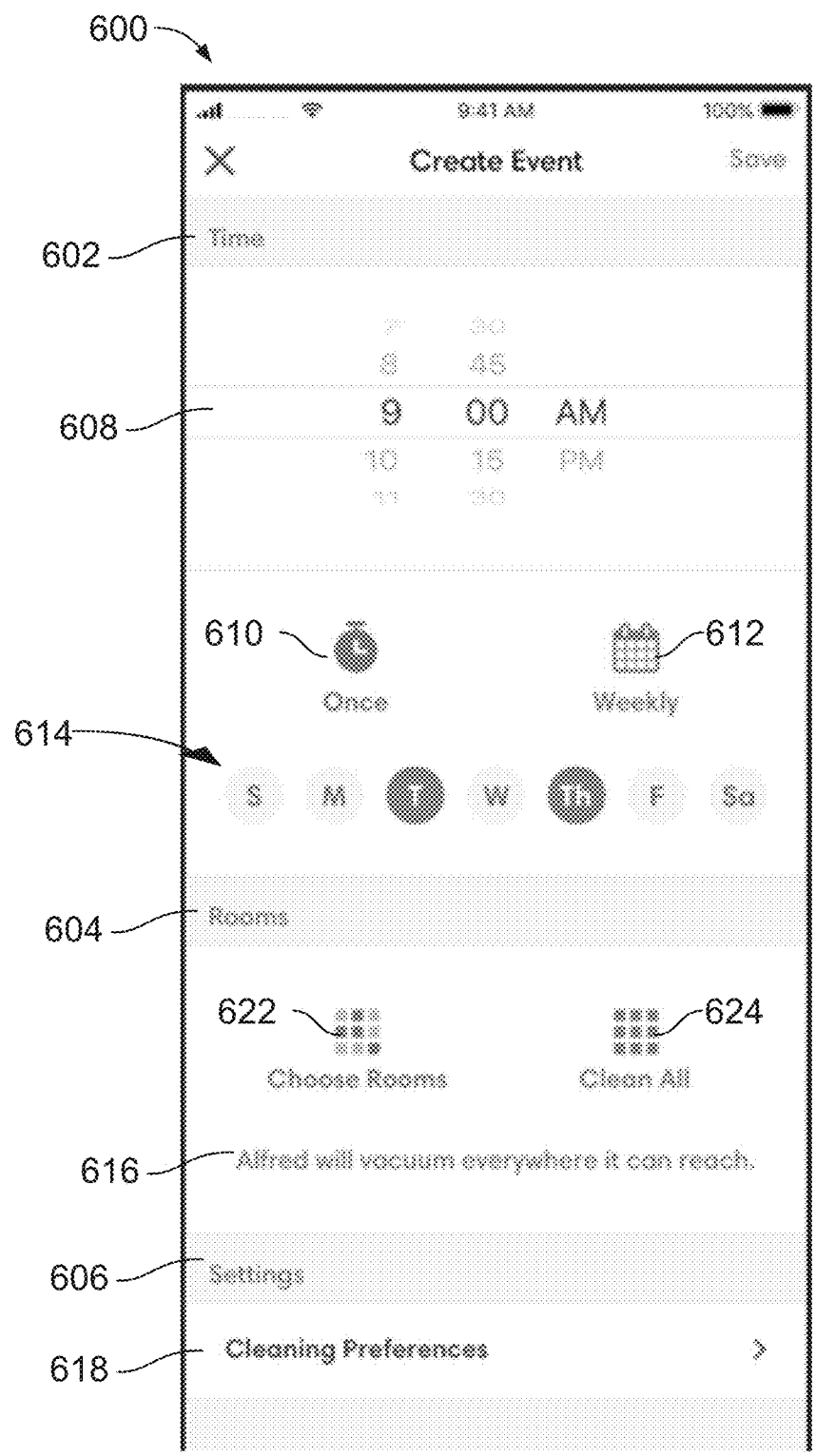

Referring to FIG. 6, an interface 600 is presented on the display of the mobile device 204. The interface 600, similar to interfaces 400 and 500 discussed previously, includes a time section 602, a rooms section 604, and a settings section 606. In the time section 602, a once button 610 and a weekly button 612 are presented along with a time selector 608. Cleaning parameters may be set by selecting cleaning preferences option 618 in the setting section 606. Array 614 including day of the week buttons is presented as the weekly button 612 is selected. In the rooms section 604, a choose rooms button 622 and a clean all button 624 are presented. Selecting the clean all button 624 configures the schedule to instruct the autonomous cleaning robot to clean all available space during the scheduled cleaning mission. As the clean all button 624 is selected, text 616 is presented informing the user 202 that all available areas will be cleaned during the cleaning mission. Selecting the choose rooms button 622 causes the mobile application to present interface 700 (shown in FIG. 7), where the user 202 may select individual rooms for inclusion in the cleaning mission.

Figure 7:
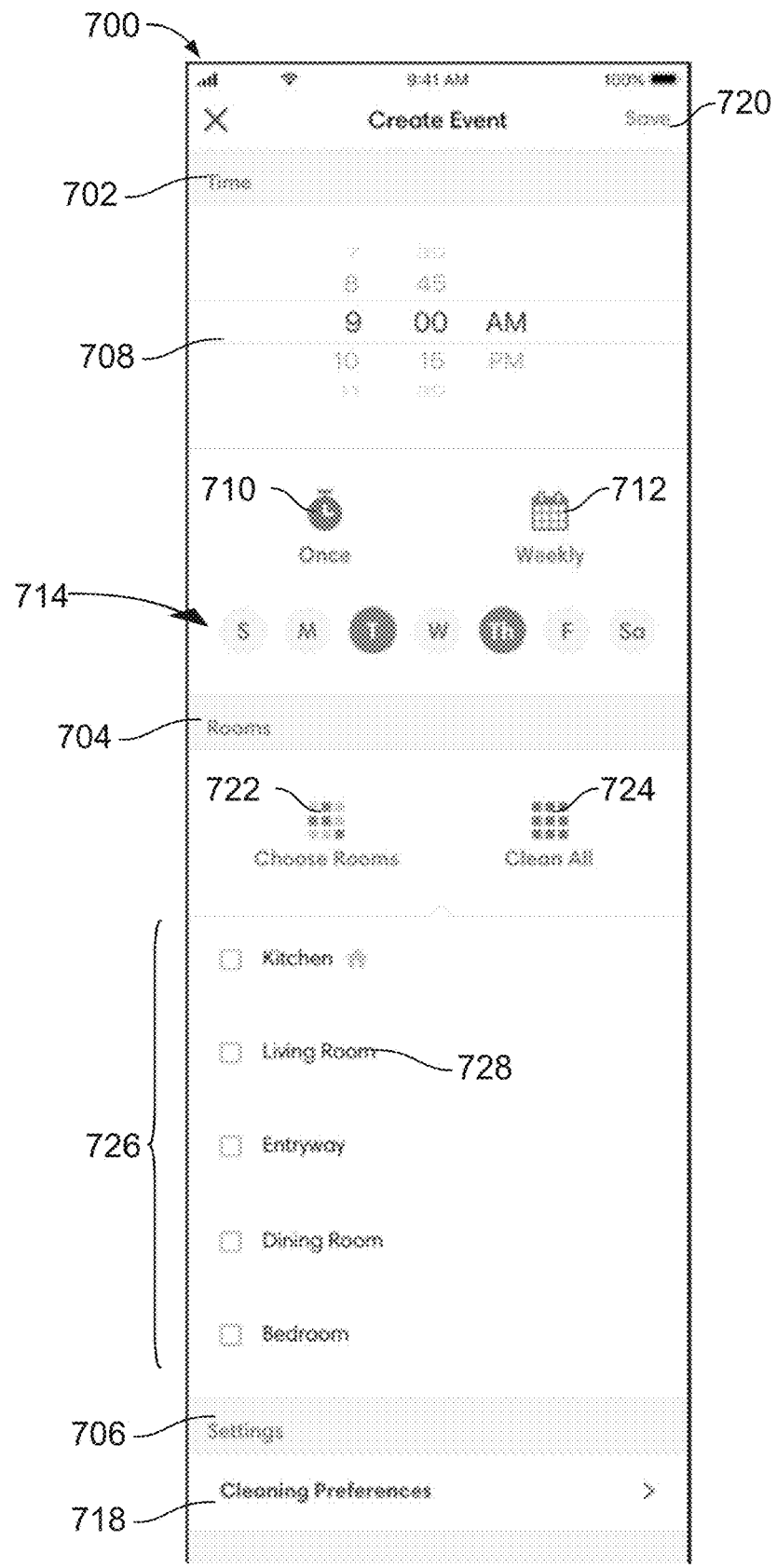
FIG. 7 is an interface showing scheduling options for scheduling a recurring cleaning mission in individual rooms for the autonomous cleaning robot shown in FIG. 1.

Referring to FIG. 7, an interface 700 shows scheduling options for scheduling a recurring cleaning mission for the autonomous cleaning robot 214 in individual rooms. The interface 700, similar to interfaces 400, 500, and 600 discussed previously, includes a time section 702, a rooms section 704, and a settings section 706. In the time section 702, a once button 710 and a weekly button 712 are presented along with a time selector 608. Cleaning parameters may be set by selecting cleaning preferences option 718 in the setting section 706. Array 714 including day of the week buttons is presented as the weekly button 712 is selected. In the rooms section 704, a choose rooms button 722 and a clean all button 724 are presented.

Figure 9:
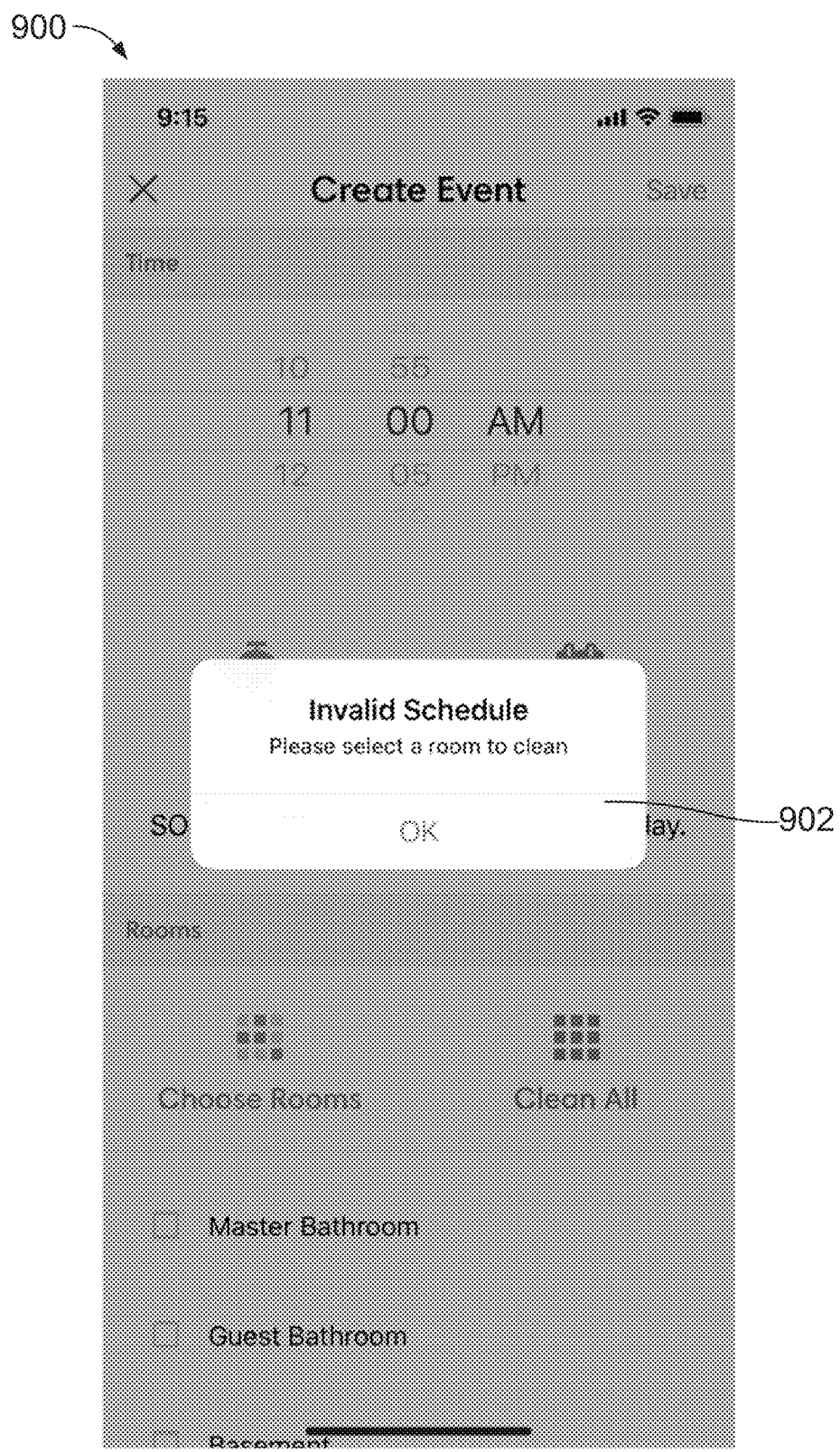
FIG. 9 is an interface showing an invalid schedule error.

Upon selecting the choose rooms button 722, a list of rooms 726 is presented in the rooms section 704. The list of rooms 726 includes room labels, e.g., label 728. Each room label on the list of rooms 726 corresponds to a room in the user's space (e.g., the user's home) that has been learned by the autonomous cleaning robot 214. Rooms may be learned by the autonomous cleaning robot 214 traversing the room during cleaning missions or training missions. During training missions, the autonomous cleaning robot 214 may not perform cleaning functions (e.g., vacuuming, mopping, etc.) as it traverses the room. Each room label on the list of rooms 726 that is selected is included in the schedule. For example, in the interface 700, if room label 728 is selected, a transmission is initiated to be sent to the autonomous cleaning robot 214 to initiate a cleaning mission to clean the Living Room (corresponding to room label 728) at 9:00 AM on Tuesdays and Thursdays. If the user 202 attempts to store (e.g. by selecting save button 720) the schedule of interface 700 without selecting at least one room label, an interface 900, as shown in FIG. 9, is presented. The interface 900 includes an error message 902 that the schedule is invalid for not including at least one room in the schedule. The cleaning mission is run according to a set of cleaning parameters defined through selecting a cleaning preferences option 718 in the settings section 706.

Figure 8:
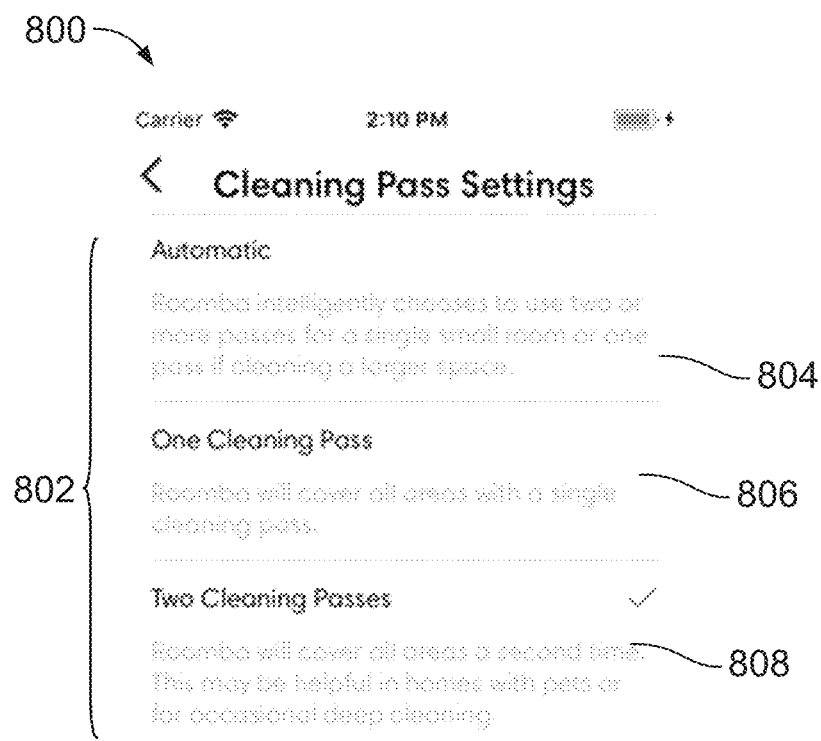
FIG. 8 is an interface showing a menu of cleaning settings to be used during a scheduled cleaning mission.

Referring to FIG. 8, an interface 800 presents a menu 802 of cleaning parameters to be used to define cleaning operations performed during a scheduled cleaning mission. The menu 802 includes cleaning pass options 804, 806, and 808 corresponding to automatic cleaning, one pass cleaning, and two pass cleaning, respectively. If option 804 is selected, the autonomous cleaning robot selects one or two pass cleaning based on a size of the area being cleaned. If option 806 is selected, the autonomous cleaning robot 214 covers the area in a single cleaning pass and if option 808 is selected, the autonomous cleaning robot 214 covers the area a second time. In some implementations, additional or alternative cleaning parameters may be presented for selection by the user 202, e.g., spot cleaning, edge cleaning, vacuum power, cleaning type (e.g., vacuuming, sweeping, mopping), etc. In some implementations, cleaning parameters, such as those in menu 802, may be presented on the interface 700 (shown in FIG. 7) in the settings section 706 for selection.

Figure 10:
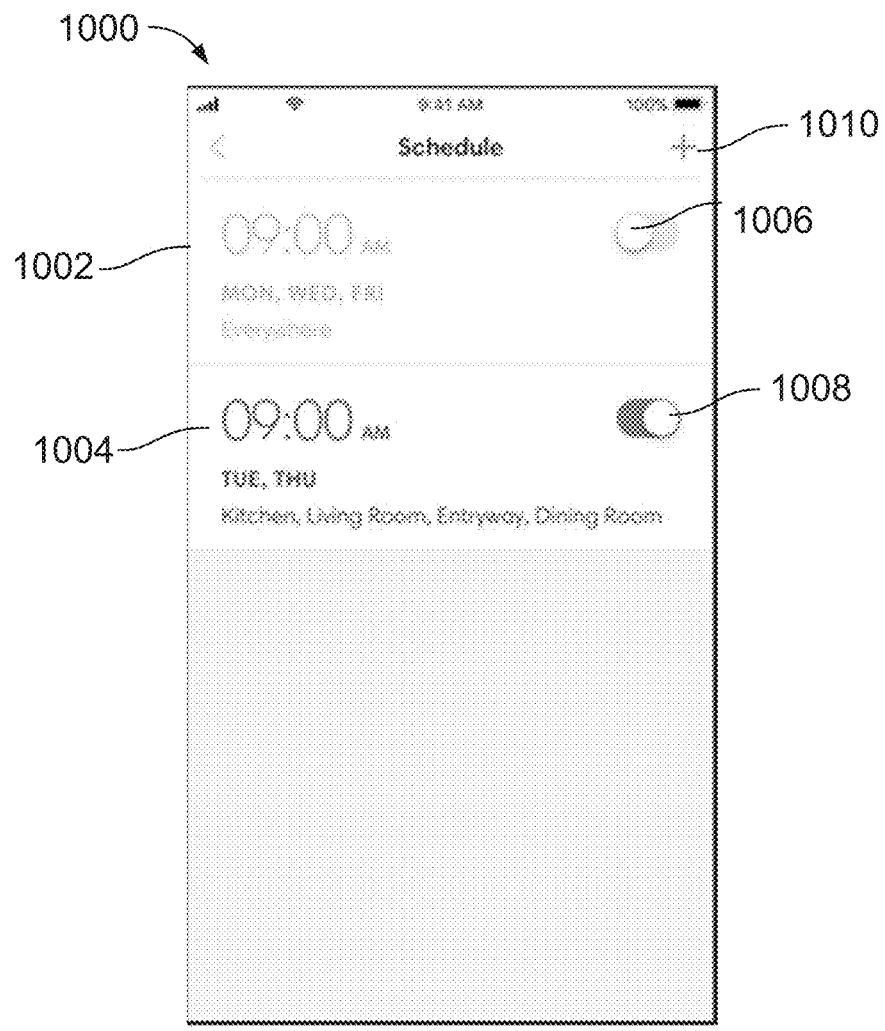
FIG. 10 is an interface showing a scheduling list including multiple schedules.
Figure 11:
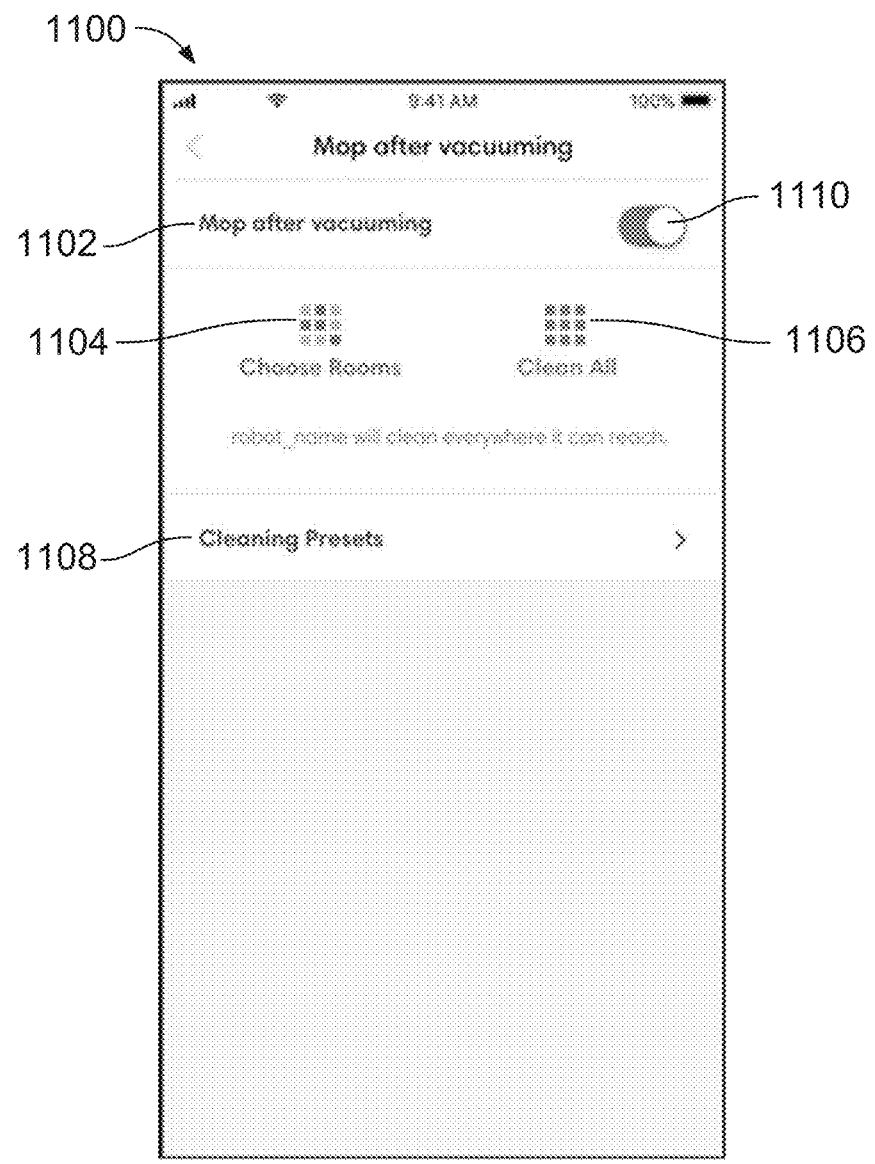
FIG. 11 is an interface showing options for creating cooperative schedules between multiple autonomous cleaning robots.

Referring to FIG. 10, an interface 1000 shows a list of cleaning schedules including a first cleaning schedule 1002 and a second cleaning schedule 1004. The first cleaning schedule 1002 is a clean all cleaning schedule for 9:00 AM on Mondays, Wednesdays, and Fridays. The first cleaning schedule is deactivated as shown by the a toggle 1006 being in a first position. In some implementations, the first schedule may be shown on the interface 1000 as greyed out, in a different color, etc. The first cleaning schedule may be activated by selecting a toggle 1006. The second cleaning schedule 1004 is a room-specific cleaning schedule for 9:00 AM on Tuesdays and Thursdays. The second cleaning schedule 1004 includes instructions to clean the Kitchen, Living Room, Entryway, and Dining Room. The second cleaning schedule 1004 is activated as shown by a toggle 1008, which may be selected to turn the second cleaning schedule 1004 off. In the implementation shown by FIG. 10, the mobile device 204 initiates a cleaning mission corresponding to the second cleaning schedule 1004 (which is activated), but not the first cleaning schedule 1002 (which is deactivated). The user 202 may add and customize additional cleaning schedules by selecting an add button 1010 on the interface 1000, which will bring the user 202 to interfaces like interfaces 400, 500, 600, and/or 700, as discussed above.

In some implementations, multiple autonomous cleaning robots may be configured to navigate a space and communicate with the mobile device 204. As shown in an interface 1100 in FIG. 11, a second autonomous cleaning robot may be configured to follow a first autonomous cleaning robot and perform a different cleaning task. For example, interface 1100 shows an option 1102 for the second autonomous cleaning robot to perform a mopping function after the first autonomous cleaning robot performs a vacuuming function. This option 1102 may be activated and deactivated by toggle 1110. The user 202 may select a choose rooms button 1104 or a clean all button 1106 and may select cleaning parameters through cleaning presets option 1108. The interface 1100 allows for coordinated cleaning between the first autonomous cleaning robot and the second autonomous cleaning robot. The mobile application 208 and the first and second autonomous cleaning robots communicate to send the second autonomous cleaning robot to perform the mopping function after the first autonomous cleaning robot has completed vacuuming in the area of interest.

Figure 12:
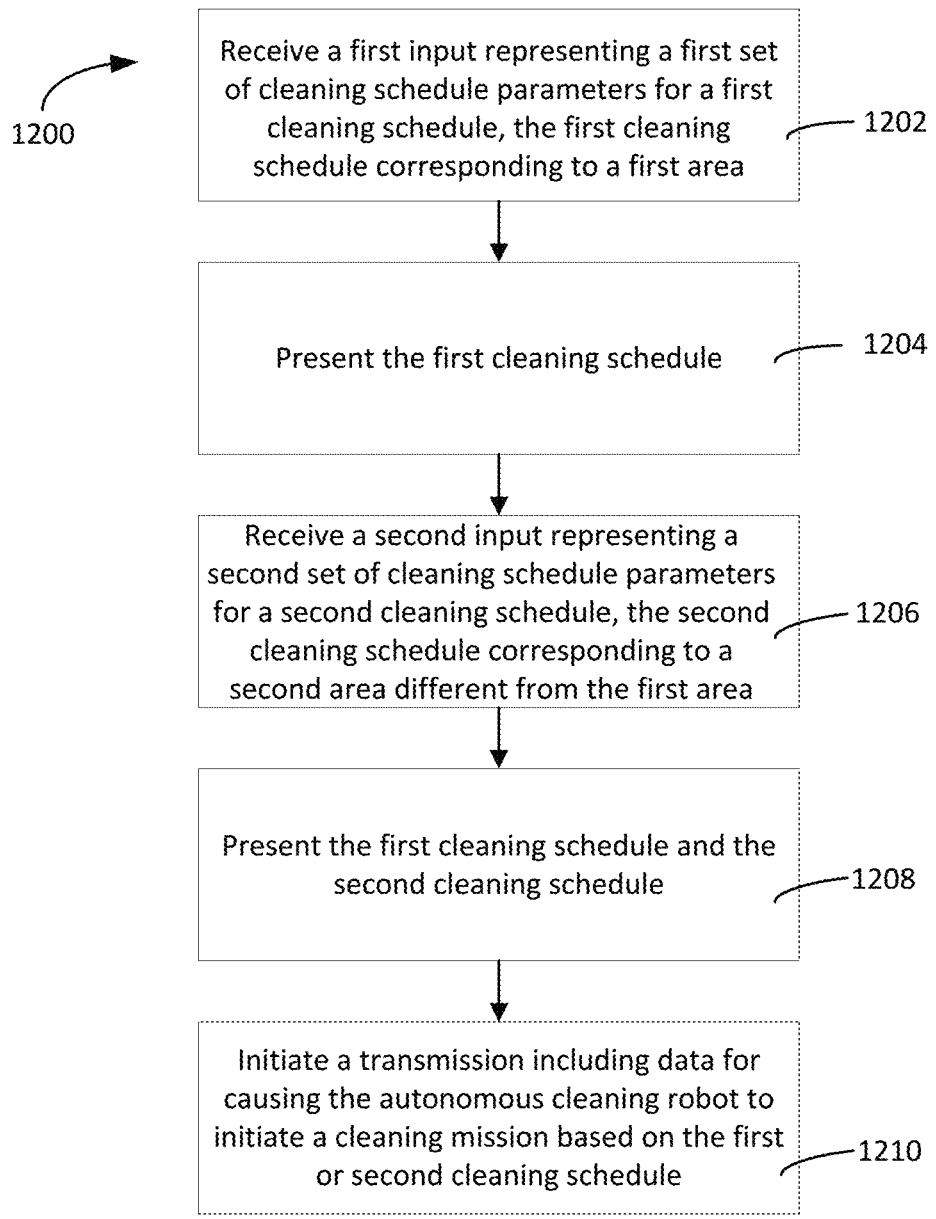
FIG. 12 is a flow chart showing a process for scheduling an autonomous cleaning robot.

Referring to FIG. 12, a flow chart 1200 depicts a process for operating the autonomous cleaning robot 214. The process includes receiving (1202), at a handheld computing device (e.g., mobile device 204), a first input representing a first set of cleaning schedule parameters for a first cleaning schedule for the autonomous cleaning robot 214. The process also includes presenting (1204), on a display of the handheld computing device, the first cleaning schedule. The process also includes receiving (1206), at the handheld computing device, a second input representing a second set of cleaning schedule parameters for a second cleaning schedule for the autonomous cleaning robot. The process also includes presenting (1208), on the display of the handheld computing device, the second cleaning schedule and the first cleaning schedule. The process also includes initiating (1210) a transmission to the autonomous cleaning robot 214, based on the first cleaning schedule or the second cleaning schedule, the transmission including data for causing the autonomous cleaning robot 214 to initiate a cleaning mission.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A method of operating at least one autonomous cleaning robot, the method comprising:
   receiving, at a handheld computing device, a first input representing a first cleaning schedule for the at least one autonomous cleaning robot, the first cleaning schedule comprising a first set of rooms;
   presenting, on a display of the handheld computing device, the first cleaning schedule;
   receiving, at the handheld computing device, a second input representing a second cleaning schedule for the at least one autonomous cleaning robot, the second cleaning schedule being different from the first cleaning schedule and comprising a second set of rooms;
   presenting, on the display of the handheld computing device, the second cleaning schedule and the first cleaning schedule, a first single user control associated with the first cleaning schedule and a second single user control associated with the second cleaning schedule; and
   initiating a transmission to the at least one autonomous cleaning robot, based on the first cleaning schedule or the second cleaning schedule, the transmission comprising data for causing the at least one autonomous cleaning robot to initiate a cleaning mission.

2. The method of claim 1, wherein at least one room in the second set of rooms is different from the first set of rooms.

3. The method of claim 1, wherein the first cleaning schedule and the second cleaning schedule are scheduled for the same day.

4. The method of claim 1, wherein the first cleaning schedule presented on the display is selectable to activate or deactivate the first cleaning schedule.

5. The method of claim 1, wherein at least one of the first cleaning schedule and the second cleaning schedule is selectable to be activated in a recurring manner.

6. The method of claim 1, wherein at least one of the first cleaning schedule and the second cleaning schedule is selectable to be activated for a single instance.

7. The method of claim 1, wherein at least one of the first cleaning schedule or the second cleaning schedule comprises selectable rooms for cleaning by the at least one autonomous cleaning robot.

8. The method of claim 1, wherein at least one of the first cleaning schedule or the second cleaning schedule comprises a selection to clean all of the first or the second set of rooms during the cleaning mission.

9. The method of claim 1, wherein at least one of the first cleaning schedule or the second cleaning schedule comprises selectable floors for cleaning by the at least one autonomous cleaning robot.

10. The method of claim 1, wherein initiating the transmission to the at least one autonomous cleaning robot is based on a user input to activate the first cleaning schedule via the first single user control, or to activate the second cleaning schedule via the second single user control.

11. A handheld computing device comprising:
    one or more input devices configured to:
    receive a first input representing a first cleaning schedule for at least one autonomous cleaning robot, the first cleaning schedule comprising a first set of rooms;
    receive a second input representing a second cleaning schedule for the at least one autonomous cleaning robot, the second cleaning schedule being different from the first cleaning schedule and comprising a second set of rooms;
    a display; and
    a processor configured to:
    present, on the display, the first cleaning schedule, the second cleaning schedule, a first single user control associated with the first cleaning schedule, and a second single user control associated with the second cleaning schedule;
    and
    initiate a transmission to the at least one autonomous cleaning robot, based on the first cleaning schedule or the second cleaning schedule, the transmission comprising data for causing the at least one autonomous cleaning robot to initiate a cleaning mission.

12. The device of claim 11, wherein at least one room in the second set of rooms is different from the first set of rooms.

13. The device of claim 11, wherein the first cleaning schedule and the second cleaning schedule are scheduled for the same day.

14. The device of claim 11, wherein the first cleaning schedule presented on the display is selectable to activate or deactivate the first cleaning schedule.

15. The device of claim 11, wherein at least one of the first cleaning schedule and the second cleaning schedule is selectable to be activated in a recurring manner.

16. The device of claim 11, wherein at least one of the first cleaning schedule and the second cleaning schedule is selectable to be activated for a single instance.

17. The device of claim 11, wherein at least one of the first cleaning schedule or the second cleaning schedule comprises selectable rooms for cleaning by the at least one autonomous cleaning robot.

18. The device of claim 11, wherein at least one of the first cleaning schedule or the second cleaning schedule comprises a selection to clean all of the first or the second set of rooms during the cleaning mission.

19. The device of claim 11, wherein at least one of the first cleaning schedule or the second cleaning schedule comprises selectable floors for cleaning by the at least one autonomous cleaning robot.

20. The device of claim 11, wherein the processor is configured to initiate the transmission to the at least one autonomous cleaning robot based on a user input to activate the first cleaning schedule via the first single user control, or to activate the second cleaning schedule via the second single user control.

\* \* \* \* \*